United States Patent
Wilda et al.

[11] Patent Number: 6,041,659
[45] Date of Patent: Mar. 28, 2000

[54] METHODS AND APPARATUS FOR SENSING DIFFERENTIAL AND GAUGE STATIC PRESSURE IN A FLUID FLOW LINE

[75] Inventors: Douglas W. Wilda; James V. Davidson, both of Ambler, Pa.; Max C. Glenn, Shorewood, Minn.; Thomas P. Overholt, Chalfont, Pa.; Raymond F. McMullen, Shorewood, Minn.

[73] Assignee: Honeywell Inc., Minneapolis, Minn.

[21] Appl. No.: 09/112,512

[22] Filed: Jul. 9, 1998

[51] Int. Cl.$^7$ ...................................................... G01L 9/04
[52] U.S. Cl. .............................................................. 73/720
[58] Field of Search ................................. 73/720, 726, 756, 73/861.42, 861.44, 861.47; 364/506, 510

[56] References Cited

U.S. PATENT DOCUMENTS

5,606,513  2/1997  Louwagie et al. ...................... 364/510

Primary Examiner—William Oen
Attorney, Agent, or Firm—Joseph J. Kaliko

[57] ABSTRACT

The apparatus of the invention includes a sensor header and a sensor cover which are coupled to a prior art diaphragm assembly. The sensor header is provided with two piezoresistive silicon membrane strain gauges. One side of both strain gauges is exposed to fluid at upstream high pressure. The other side of the first strain gauge is exposed to fluid at downstream low pressure and the other side of the second strain gauge is exposed to the atmosphere. The sensor header is provided with a first port which is fluidly coupled to the first membrane strain gauge and extends to the surface of the header at a first location. The sensor header is provided with a second port which is fluidly coupled to the second membrane strain gauge and extends to the surface of the header at a second location. The sensor cover defines two isolated annular spaces around the sensor header, a first annular space around the first location and a second annular space around the second location. The first annular space is fluidly coupled to the low pressure port of a conventional diaphragm assembly and the second annular space is fluidly coupled to the atmosphere. The method of the invention is to provide two piezoresistive membrane strain gauges, expose a first side of each strain gauge to fluid at upstream high pressure, expose the second side of the first strain gauge to fluid at downstream low pressure, and expose the second side of the second strain gauge to atmospheric pressure.

20 Claims, 10 Drawing Sheets

METHODS AND APPARATUS FOR SENSING DIFFERENTIAL AND GAUGE STATIC PRESSURE IN A FLUID FLOW LINE

BACKGROUND OF THE INVENTION

1. Field of the Invention

The invention relates to sensors for sensing pressure in a fluid flow line. More particularly, the invention relates to a sensor for sensing differential pressure across an orifice plate in a fluid flow line and for sensing gauge pressure upstream or downstream of the orifice plate.

2. Brief Description of the Prior Art

There are many industrial applications which require the measurement of pressures and temperatures in fluid flow lines.

The oil and gas and chemical processing industries, for example, utilize fluid flow line sensors for a variety of reasons. One common utilization of fluid flow line sensors is to determine flow rate, and thus the volume or mass of fluid passing through a flow line.

Often these measurements are used to compute the cost of a fluid such as hydrocarbon gas which is transferred by pipe from a supplier to a purchaser. It is therefore important that the measurements be as accurate as possible.

Figure 1:
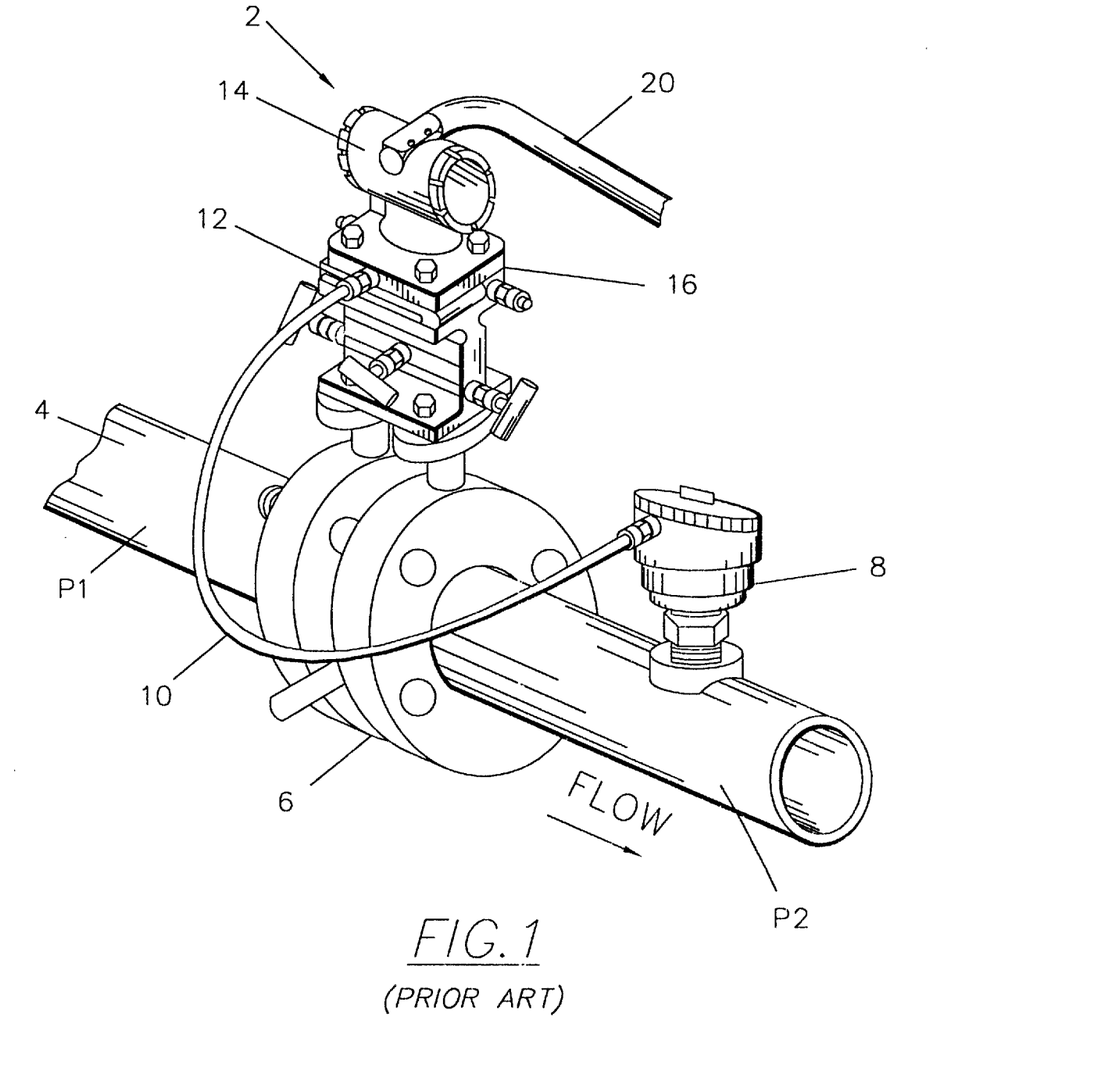
FIG. 1 is a broken perspective view of a prior art apparatus for measuring pressure and temperature in a fluid flow line.

State-of-the-art fluid flow computers utilize pressure and temperature measurements to determine flow rate. For example, prior art FIG. 1 illustrates pressure/temperature transmitter 2 which is mechanically coupled to a flow line 4 on either side of a orifice plate 6.

A temperature sensor 8 is provided downstream of the orifice plate 6 and is electrically coupled to the transmitter 2 by a cable 10 through an explosion proof boss 12. The transmitter 2 transmits differential pressure, absolute pressure, and process temperature from an electronics package 14 through a cable 20 to another device (not shown). Pressure sensors (not shown) are housed in housing 16.

The orifice plate 6 causes a drop in pressure from the upstream pressure P1 to the downstream pressure P2 so that a differential pressure may be measured. Different state-of-the-art pressure sensors sense pressure in different ways.

Differential pressure is preferably sensed using a piezoresistive silicon membrane where one side of the membrane is exposed to upstream fluid pressure and the other side of the membrane is exposed to downstream fluid pressure.

Figure 2:
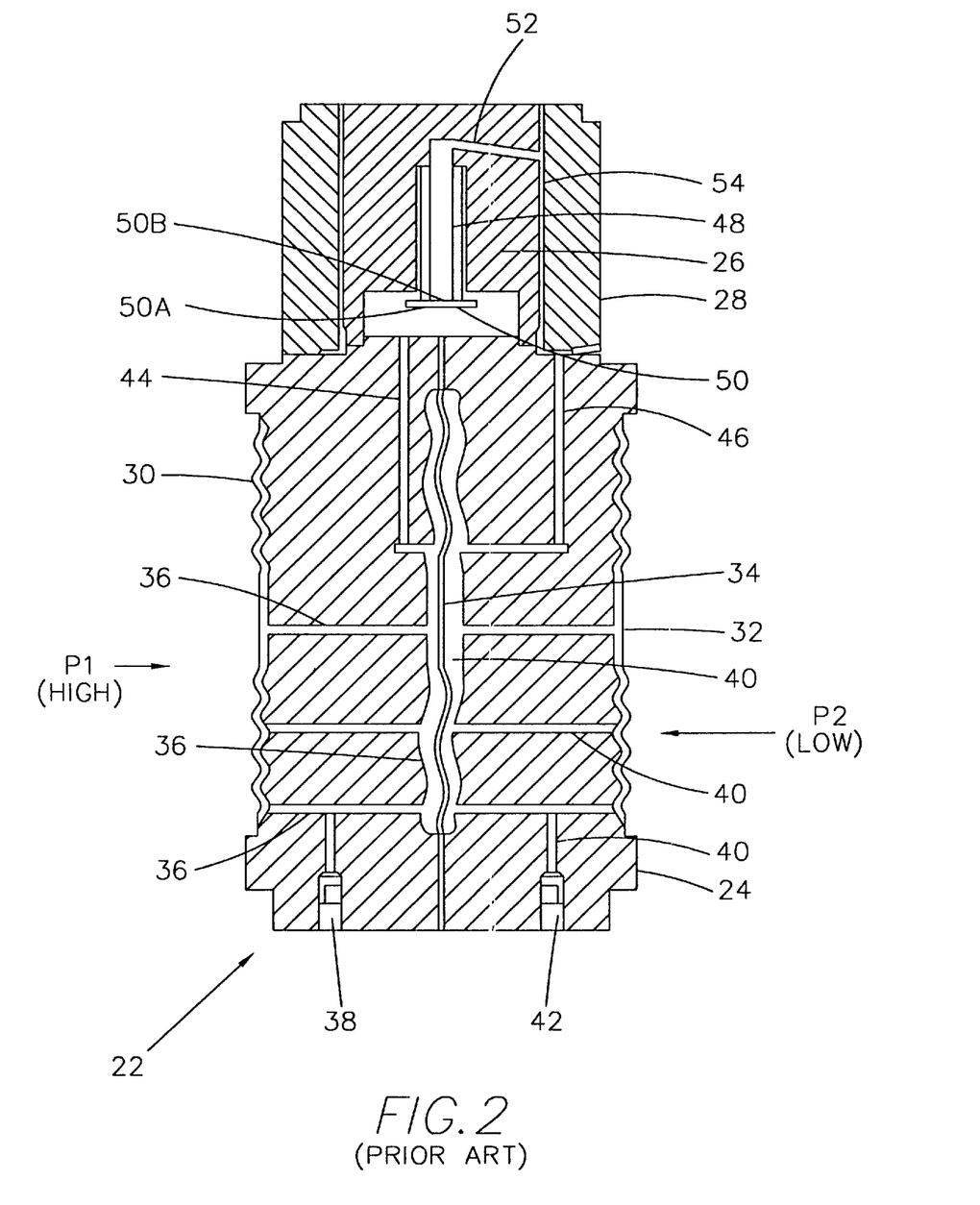
FIG. 2 is a schematic sectional view of a prior art piezoresistive sensor assembly ("meter body") for measuring differential pressure in a fluid flow line.

Prior art FIG. 2 shows an example of a "meter body" 22 which is used for sensing differential pressure. The meter body 22 generally includes a stainless steel diaphragm assembly 24, a sensor header 26, and a sensor cover 28. The diaphragm assembly 24 includes high pressure diaphragm 30, a low pressure diaphragm 32, and a differential pressure diaphragm 34. The high pressure diaphragm 30 is exposed to upstream high pressure P1 and the low pressure diaphragm 32 is exposed to downstream low pressure P2.

A plurality of contiguous cavities 36 between the high pressure diaphragm 30 and the differential pressure diaphragm 34 are filled with an appropriate fluid such as silicon oil via a fill port 38. Similarly, a plurality of contiguous cavities 40 between the low pressure diaphragm 32 and the differential pressure diaphragm 34 are filled with silicon oil via a fill port 42. High pressure silicon oil is conducted from cavities 36 to a location on one end of the diaphragm assembly 24 via a pressure port 44. Low pressure silicon oil is conducted from cavities 40 to another location at the same end of the diaphragm assembly via a pressure port 46. The sensor header 26 and sensor cover 28 are attached to the end of the diaphragm assembly 24 where the ports 44 and 46 terminate.

The sensor header 26 houses a glass tube 48 with a piezoresistive silicon membrane 50 attached to one end. The other end of the tube 48 is coupled to a radial bore 52 which extends to the side surface of the header 26. The sensor cover 26 is dimensioned to provide an annular space 54 between the sensor header 26 and sensor cover 28. The sensor header 26 and sensor cover 28 are coupled to the diaphragm assembly 24 such that the high pressure port 44 is in fluid communication with one side 50a of the membrane 50 and the low pressure port is in fluid communication with the other side 50b of the membrane 50.

It will be appreciated from FIG. 2 that the side 50b is brought into fluid communication with the port 46 via the tube 48, the bore 52, and the annular space 54.

The piezoresistive silicon membrane 50 is essentially a strain gauge. As illustrated in prior art FIGS. 3 and 3A, four electrical resistors 56a–56d are embedded in the silicon membrane 50 to form a Wheatstone bridge.

Figure 3:
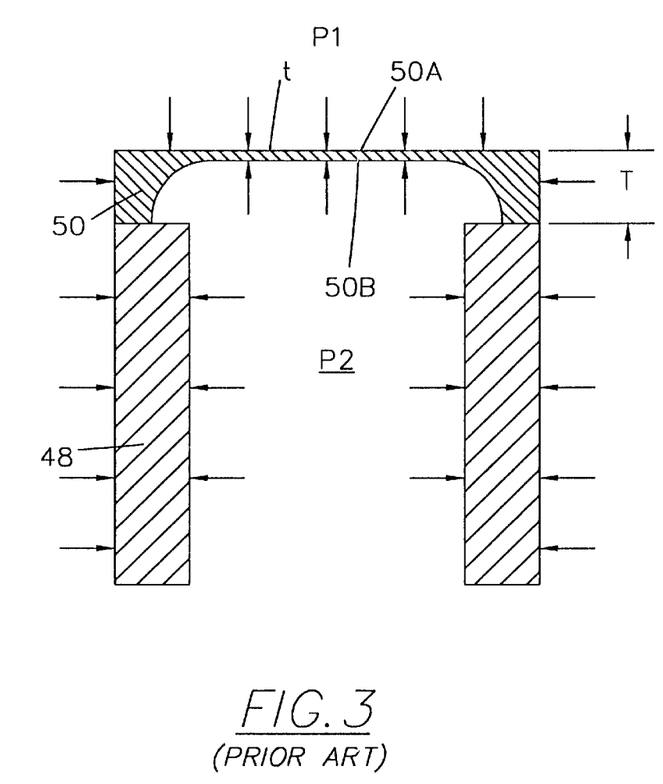
FIG. 3 is a schematic side sectional view of the piezoresistive membrane of the prior art apparatus of FIG. 2.
Figure 3A:
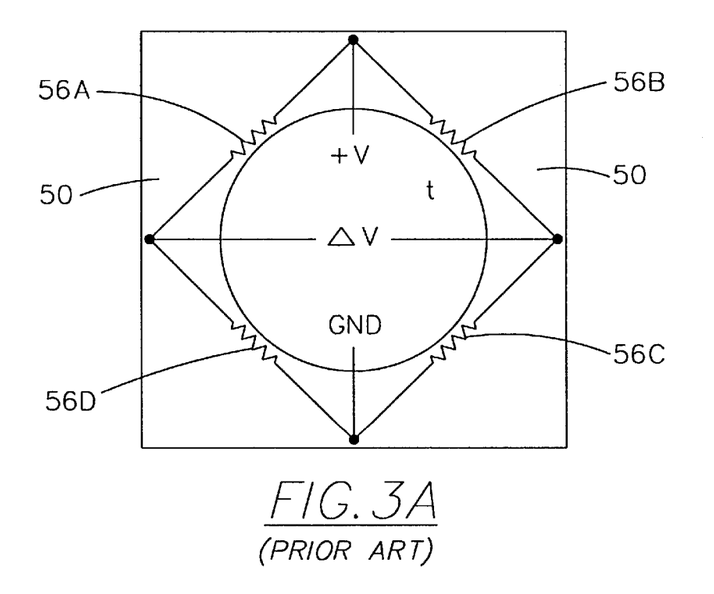
FIG. 3A is a schematic top view of the prior art piezoresistive membrane of FIG. 3.

Those skilled in the art will appreciate that the change in voltage Delta V across two nodes of the bridge shown in FIG. 3A is proportional to the differential pressure dP=P1-P2. As illustrated schematically in FIGS. 3 and 3A, the membrane 50 is rectangular having an overall thickness "T" and a central circular portion of reduced thickness "t". The ratio of T:t is approximately 50:1 and t is approximately 1 mil. The resistors 56a–56d are preferably arranged at the interface between thickness T and thickness t and according to the lattice structure of the silicon in order to provide the most accurate measurements.

According to some prior art methods, the differential pressure together with temperature is useful in calculating flow rate. A prior art pressure sensor utilizing the principles illustrated in FIGS. 2, 3, and 3A is the Honeywell ST3000 Smart Transmitter.

According to other methods, it is necessary or desirable to measure the static pressure of the fluid, either upstream or downstream. A prior art sensor which is capable of measuring both differential pressure and static pressure is the Honeywell SMV3000 Smart Multivariable Transmitter which is illustrated schematically in prior art FIGS. 4 and 4A.

Figure 4:
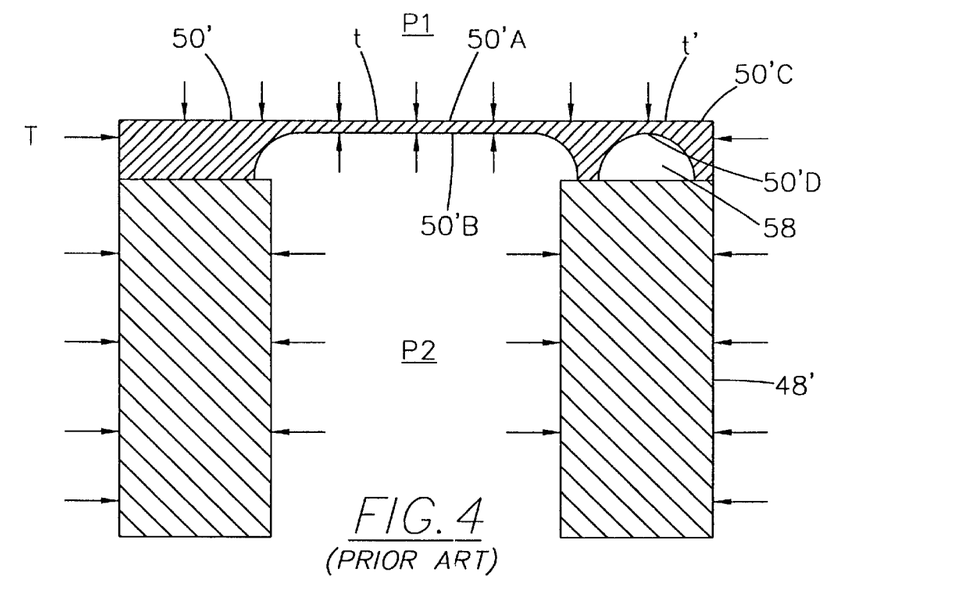
FIG. 4 is a schematic side sectional view of a piezoresistive membrane of a prior art apparatus for measuring differential pressure and absolute pressure.
Figure 4A:
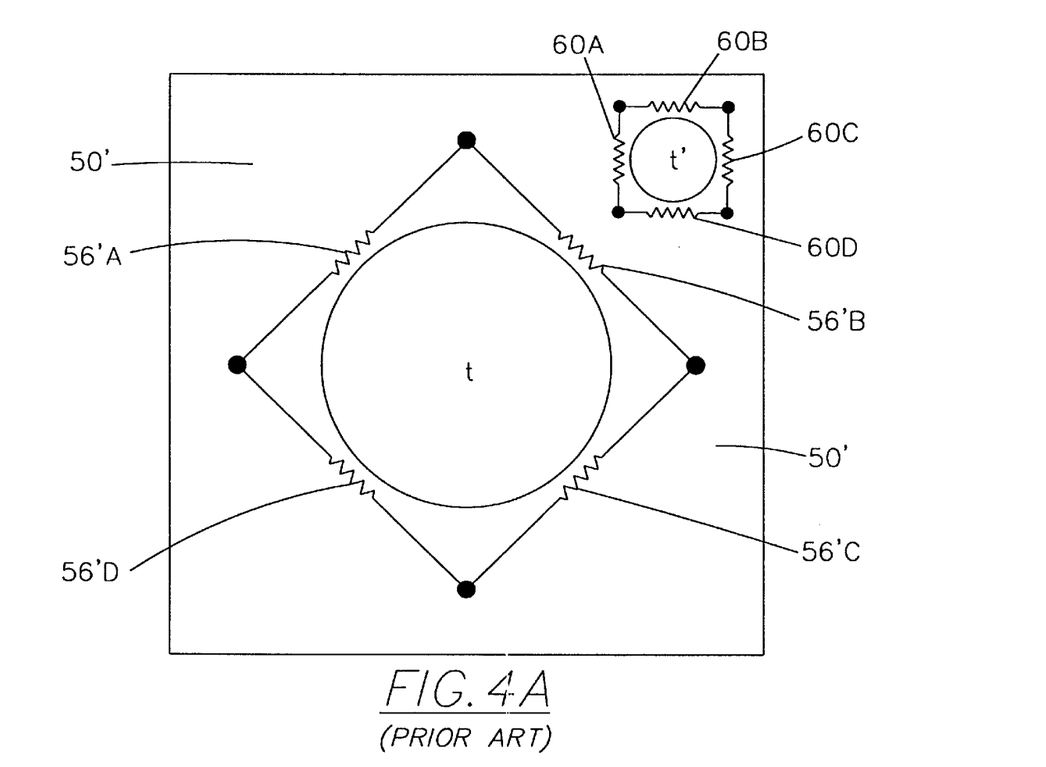
FIG. 4A is a schematic top view of the prior art piezoresistive membrane of FIG. 4.

As shown in FIGS. 4 and 4A, a piezoresistive silicon membrane 50' is mounted on the end of a glass tube 48'. The membrane 50' differs from the membrane 50 described above in that it has a second area of reduced thickness t' which overlies a portion of the wall of the tube 48' and which defines a space 58 containing a vacuum. A second strain gauge comprising resistors 60a–60d is arranged around this portion t'. One side 50'c of the membrane at are t' is exposed to upstream high pressure P1 and the other side 50'd is exposed to vacuum.

Those skilled in the art will appreciate that the voltage differential measured by the strain gauge 60a–60d will be proportional to the absolute pressure Plabs. Given the pressure differential dP and the absolute upstream pressure Plabs, the absolute downstream pressure P2abs is known by Plabs-dP.

With these and some other measurements, mass flow rate and other variables can be calculated. U.S. Pat. No. 5,606, 513, the complete disclosure of which is hereby incorporated herein by reference, discloses several methods for utilizing the pressure and temperature measurements.

The Honeywell SMV-3000 is compact, efficient, relatively inexpensive, and is capable of measuring differential and absolute pressure in a single assembly. However, it is sometimes desirable to measure static pressure as gauge pressure rather than absolute pressure. One reason why gauge pressure is more desirable than absolute pressure is that it is easier to calibrate sensors using an atmospheric pressure rather than a vacuum as the reference pressure.

The previously incorporated '513 patent discloses an apparatus for measuring differential pressure dP, upstream absolute pressure P1abs, and upstream gauge pressure P1gauge. However, the apparatus requires several assemblies, is complex, mixes capacitive and piezoresistive measurements, and is relatively expensive.

SUMMARY OF THE INVENTION

It is therefore an object of the invention to provide a method and apparatus for measuring differential pressure and static gauge pressure in a fluid flow line.

It is also an object of the invention to provide a relatively inexpensive method and apparatus for measuring differential pressure and static gauge pressure in a fluid flow line.

It is another object of the invention to provide a relatively compact apparatus for measuring differential pressure and static gauge pressure in a fluid flow line.

It is still another object of the invention to provide a method and apparatus for measuring differential pressure and static gauge pressure in a fluid flow line whereby both measurements are made in a single assembly.

In accord with these objects which will be discussed in detail below, the apparatus of the present invention includes a sensor header and a sensor cover which are coupled to a prior art diaphragm assembly. The sensor header is provided with two piezoresistive silicon membrane strain gauges. One side of the membrane strain gauges is exposed to fluid at upstream high pressure. The other side of the first membrane strain gauge is exposed to fluid at downstream low pressure and the other side of the second membrane strain gauge is exposed to the atmosphere.

The sensor header is provided with a first port which is fluidly coupled to the first membrane strain gauge and extends to the surface of the header at a first location. The sensor header is provided with a second port which is fluidly coupled to the second membrane strain gauge and extends to the surface of the header at a second location.

The two sensor covers define two isolated annular spaces around the sensor header, a first annular space around the first location and a second annular space around the second location. The first annular space is fluidly coupled to the low pressure port of a conventional diaphragm assembly and the second annular space is fluidly coupled to the atmosphere.

According to a first embodiment, both strain gauges are contained on a single piece of silicon which is mounted on a glass tube. A longitudinal bore in the wall of the glass tube provides fluid access to the second side of the second strain gauge.

According to a second and preferred embodiment, two separate glass tubes are utilized and a separate piece of silicon is used for each strain gauge.

According to the presently preferred embodiment, the sensor header has a reduced diameter at the second location where the second annular space is defined by the sensor cover. The sensor cover is preferably provided in two parts which are installed and welded to the sensor header in order to provide the two isolated annular spaces.

The single tube or two tube sensor may be fabricated as an integrated package which can be tested as a sub-assembly component. Advantages of such construction include the use of a single, welded hermetic seal to guard against fill fluid leakage and (compared with the prior art) the integrated package reduces the number of components, sealing welds and cost; while improving device performance and overall design integrity.

These and other alternate embodiments of the apparatus perform the method of providing two piezoresistive membrane strain gauges, exposing a first side of each membrane strain gauge to fluid at upstream high pressure, exposing the second side of the first membrane strain gauge to fluid at downstream low pressure, and exposing the second side of the second membrane strain gauge to atmospheric pressure.

Additional objects and advantages of the invention will become apparent to those skilled in the art upon reference to the detailed description taken in conjunction with the provided Drawing.

DETAILED DESCRIPTION

Figure 5:
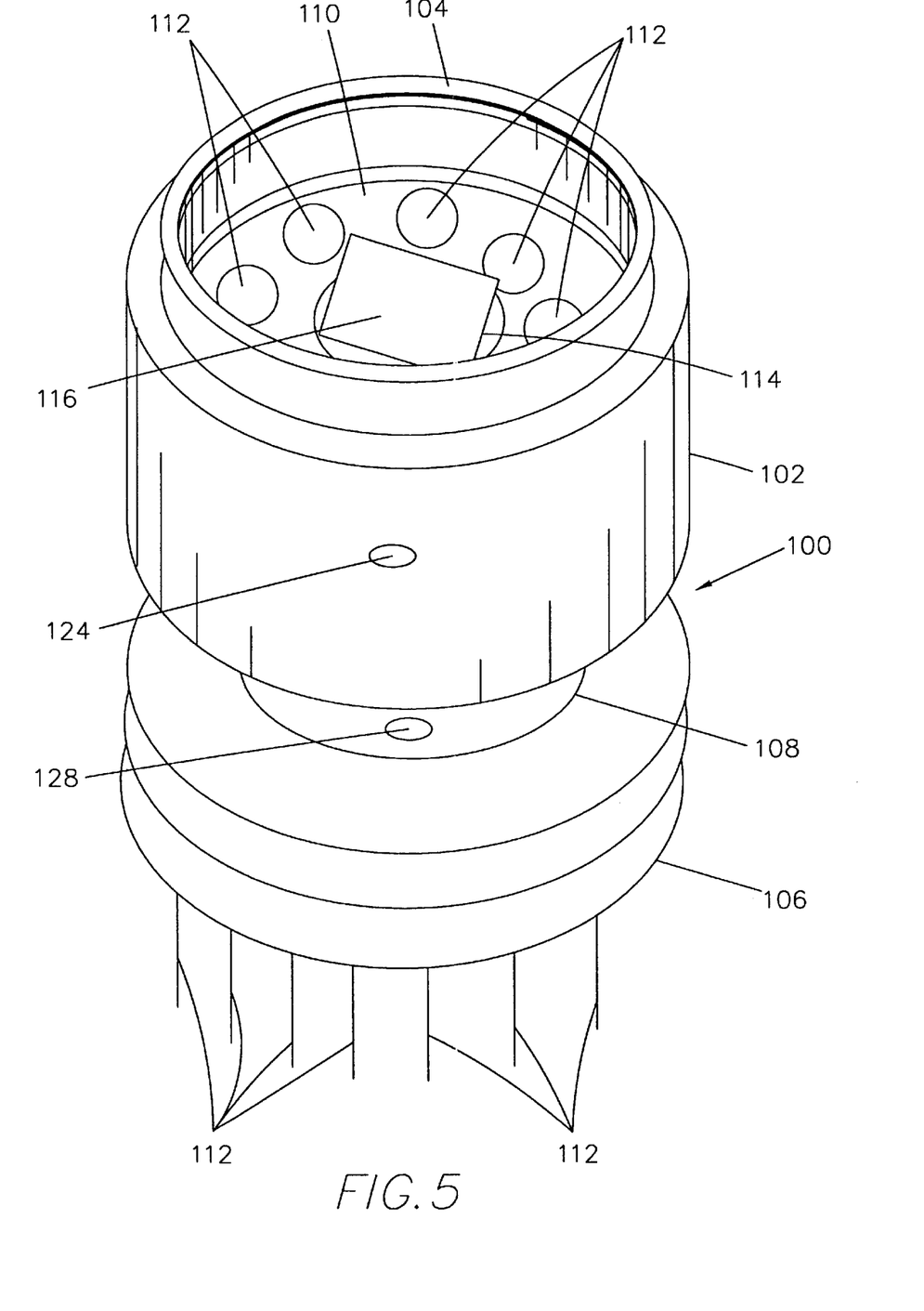
FIG. 5 is a perspective view of a first embodiment of a sensor header according to the invention.
Figure 6:
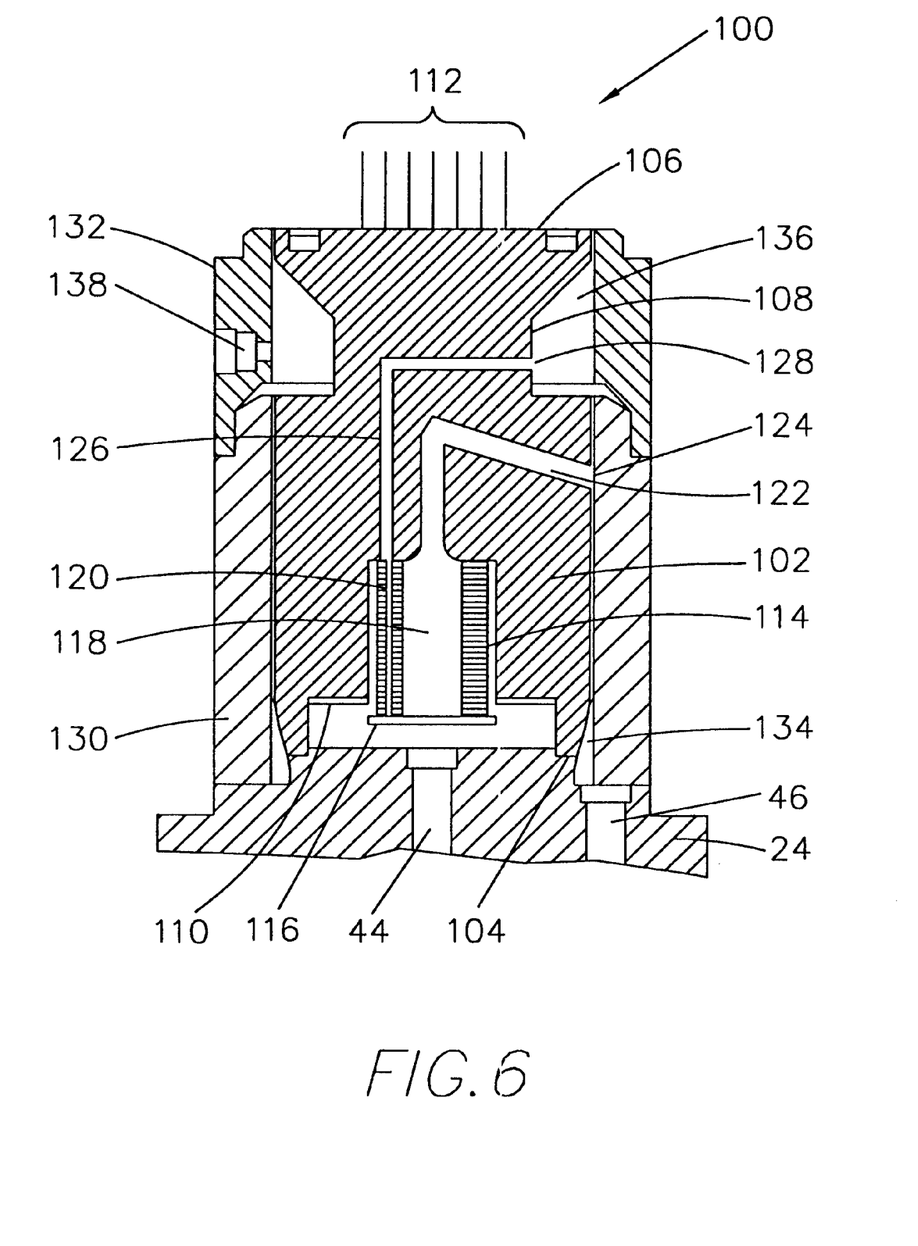
FIG. 6 is a broken side sectional view of the sensor header of FIG. 5 with a sensor cover according to the invention coupled to a diaphragm assembly.

Referring now to FIGS. 5 and 6, a sensor header 100 according to the invention includes a substantially cylindrical package 102 having a first end 104 and a second end 106 with a decreased diameter waist area 108 therebetween.

A recessed circuit board 110 is mounted near the first end 104 and a plurality of electrical connection pins 112 extend from the second end 106. The pins 112 extend to the circuit board 110 as seen best in FIG. 5. Those skilled in the art will readily appreciate that a circuit board is not required to implement the invention. For example, one could make direct electrical connection to electrical connection pins 112.

A glass tube 114 is centrally located and extends through the circuit board 110 into the interior of the package 102.

A piezoresistive silicon membrane 116 is mounted on one end of the tube 114 above the circuit board 110. The glass tube 114 has a central bore 118 and a side bore 120 which is drilled through the wall of the tube parallel to the central bore. The central bore 118 is coupled to a first fluid port 122 which extends to the surface of the package 102 at a location 124 between the first end 104 and the waist 108. The side bore 120 is coupled to a second fluid port 126 which extends to the surface of the package 102 at a location 128 on the waist 108.

As shown in FIG. 6, the sensor header 100 is coupled to a conventional diaphragm assembly 24 with the aid of a two part cover 130, 132. In particular, the first end 104 of the sensor header is welded to the diaphragm assembly 24 so that the piezoresistive silicon membrane 116 is isolated and exposed to the high pressure fluid port 44.

The first cover part 130 is placed over the sensor header and is welded to the assembly 24 to create a first annular space 134 in fluid communication with the low pressure port 46. The cover part 130 is also welded to the package 102 adjacent to the waist 108 in order to isolate the annular space 134.

As seen in FIG. 6, the annular space 134 is in fluid communication with the fluid port 122 which is in fluid communication with the central bore 118 of the glass tube 114.

The second cover part 132 is placed over the waist area 108 of the package 102, is welded to the first cover part 130 and to the second end 106 of the package 102. The second cover part 132 defines a second annular space 136 which is vented to the atmosphere by a fluid port 138 in the second cover part 132. The annular space 136 is in fluid communication with the second fluid port 126 which is in communication with the side port 120 of the glass tube 114.

Figure 7:
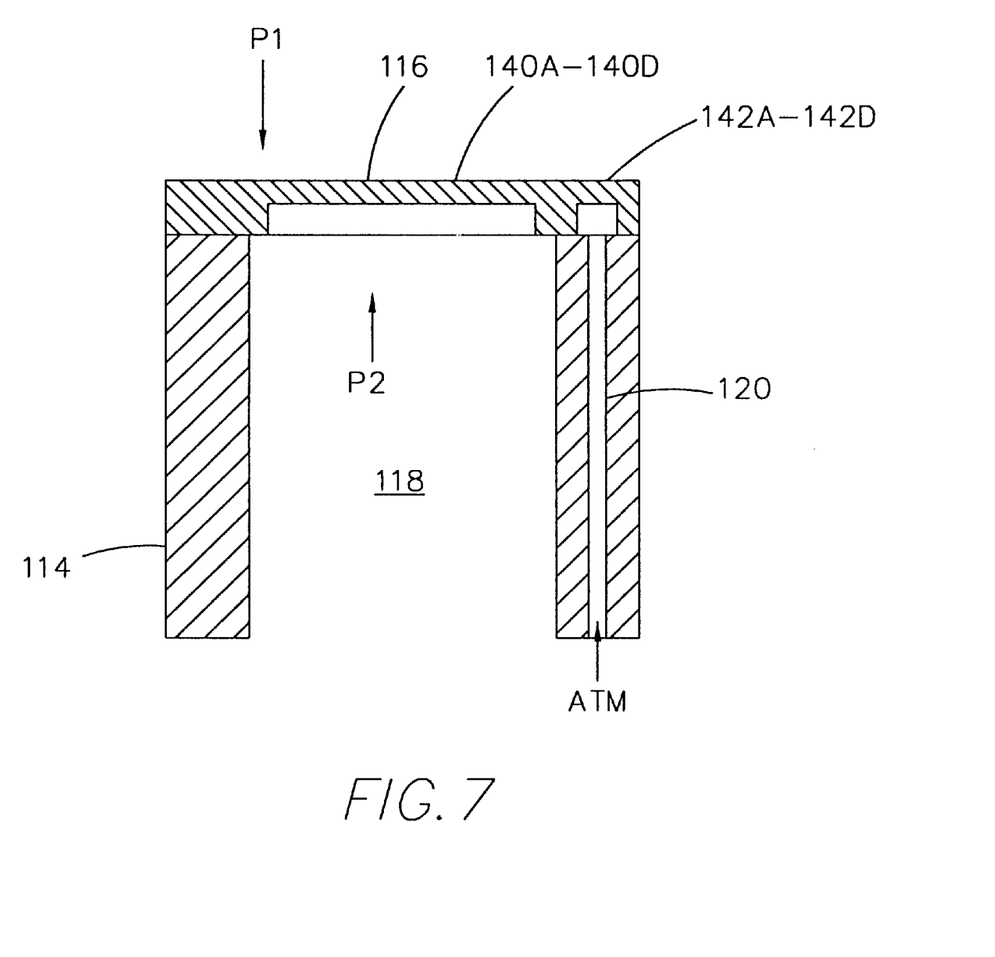
FIG. 7 is a schematic side sectional view of the piezoresistive membrane and glass tube of the sensor header of FIGS. 5 and 5.
Figure 8:
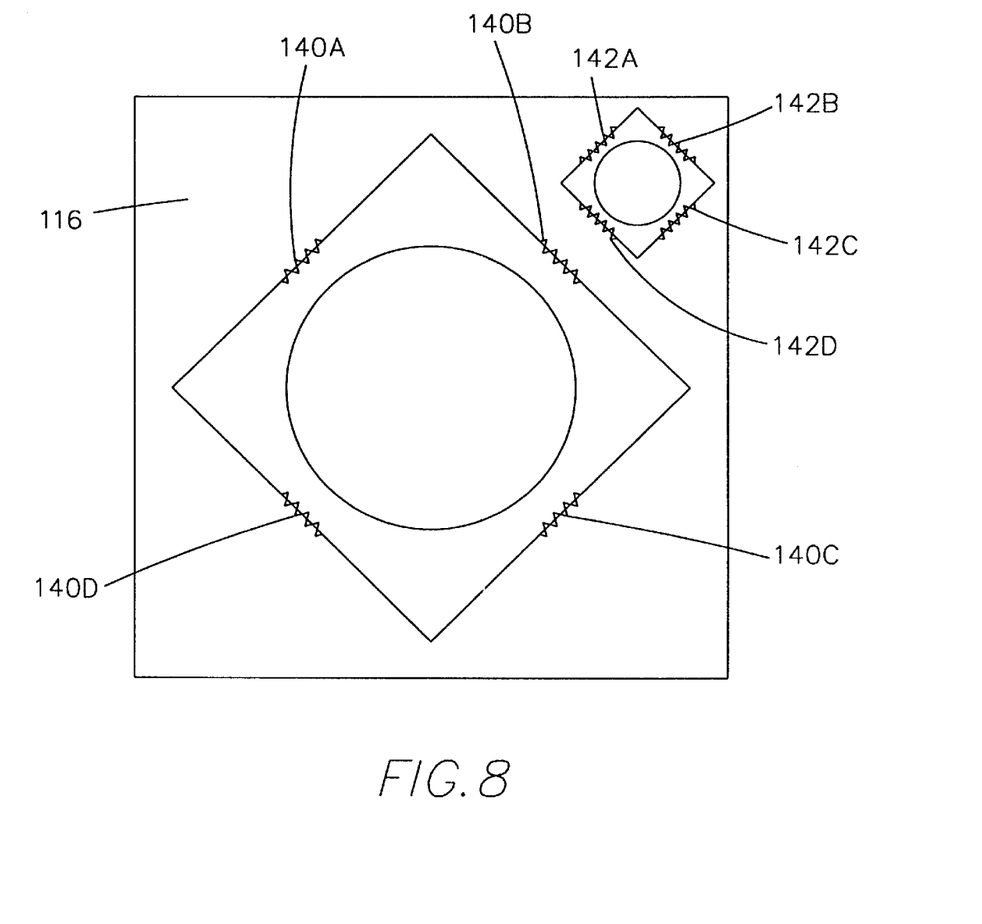
FIG. 8 is a schematic top view of the piezoresistive membrane of the sensor header of FIGS. 5–7.

Turning now to FIGS. 7 and 8, the piezoresistive silicon membrane 116 is provided with two strain gauges 140a–14d and 142a–142d.

The first strain gauge 140a–140d is located at the edge of the central bore 118 of the tube 114. The second strain gauge 142a–142d is located at the edge of the side bore 120 of the tube 114.

The first strain gauge is exposed on one side to high pressure P1 and on the other side to low pressure P2. Thus, the differential voltage from the first strain gauge will be proportional to the differential pressure dP=P1–P2. The second strain gauge is exposed on one side to high pressure P1 and on the other side to the atmosphere. Thus, the differential voltage from the second strain gauge will be proportional to the static gauge pressure P1gauge=P1-ATM (where "ATM" equals atmospheric pressure).

Those skilled in the art will appreciate that, according to one embodiment of the invention, the nodes of the strain gauges are coupled via the circuit board 110 to the pins 112 shown in FIGS. 5 and 6. In an alternative illustrative embodiment of the invention, this function could be accomplished using ball bonds direct to pins 112.

Figure 9:
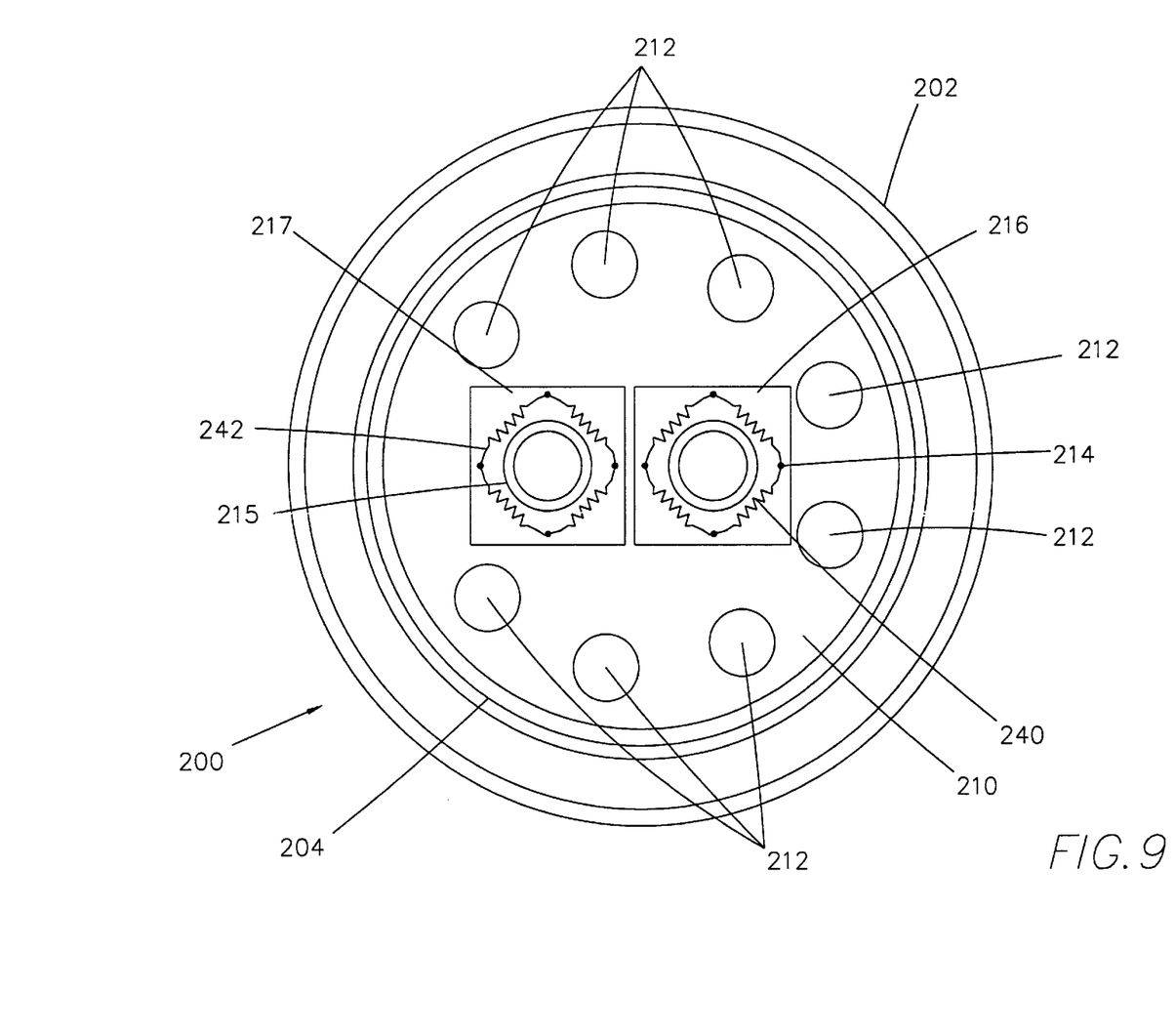
FIG. 9 is a top plan view of a second embodiment of a sensor header according to the invention.
Figure 10:
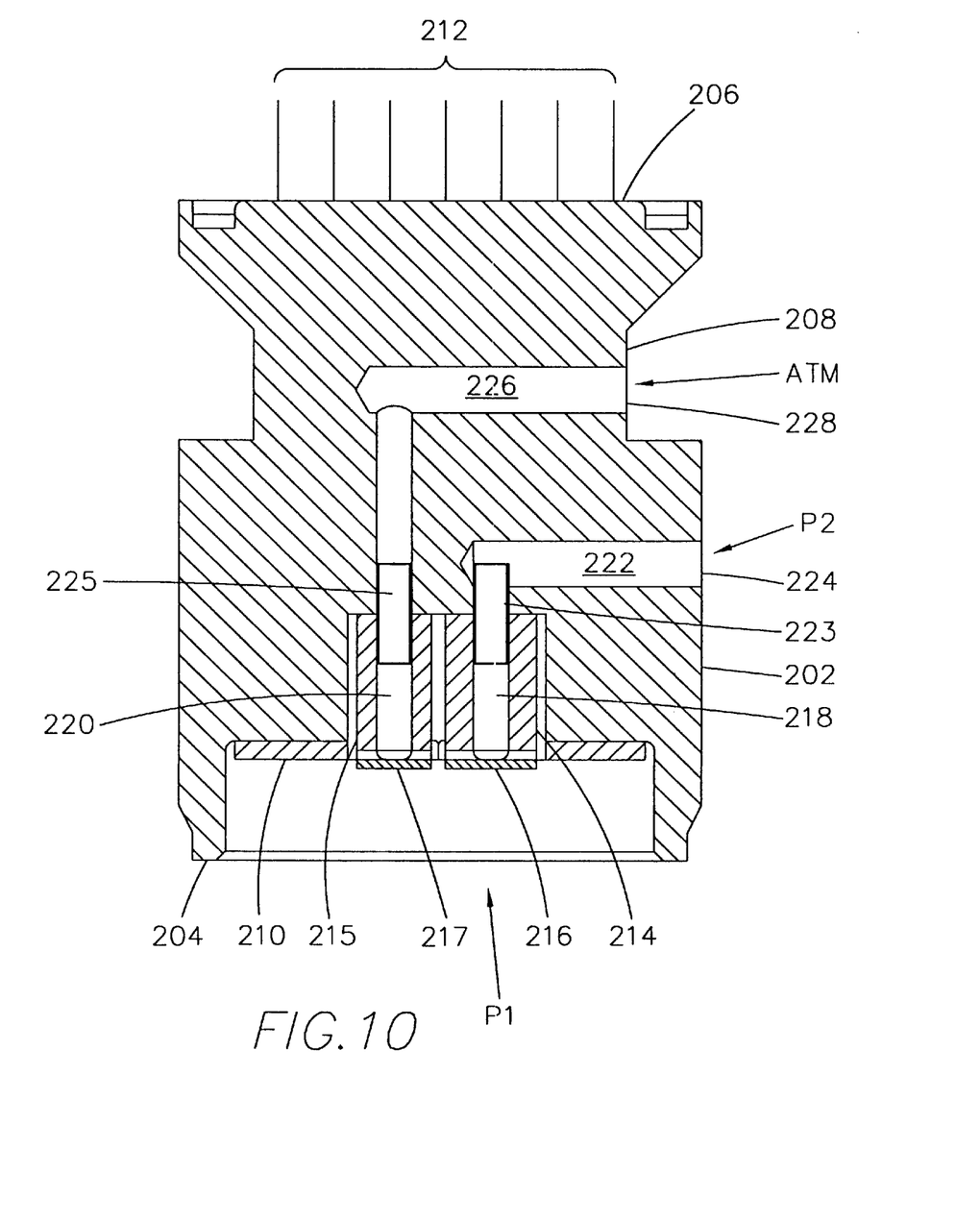
FIG. 10 is a broken side sectional view of the sensor header of FIG. 9.

Referring now to FIGS. 9 and 10, a second and presently preferred embodiment of the invention is similar to the first embodiment with similar reference numerals referring to similar parts. A sensor header 200 according to the invention includes a substantially cylindrical package 202 having a first end 204 and a second end 206 with a decreased diameter waist area 208 therebetween.

A recessed circuit board 210 is mounted near the first end 204 and a plurality of electrical connection pins 212 extend from the second end 206. The pins 212 extend to the circuit board 210 as seen best in FIG. 9.

Two glass tubes 214, 215 are centrally located and extend through the circuit board 210 into the interior of the package 202. Two piezoresistive silicon membranes 216, 217 are mounted on respective ends of the tubes 214, 215 above the circuit board 210.

The glass tube 214 has a central bore 218 and the glass tube 215 has a central bore 220. The central bore 218 is coupled to a first fluid port 222 which extends to the surface of the package 202 at a location 224 between the first end 204 and the waist 208.

The bore 220 is coupled to a second fluid port 226 which extends to the surface of the package 202 at a location 228 on the waist 208.

The sensor header 200 is coupled to a conventional diaphragm assembly with the aid of the two part sensor cover 130, 132 shown in FIG. 6 in the same manner as described above with respect to the sensor header 100. Each of the piezoresistive silicon membranes 214, 215 is provided with a respective strain gauge 240, 242.

The first strain 240 gauge is exposed on one side to high pressure P1 and on the other side to low pressure P2. Thus, the differential voltage from the first strain gauge will be proportional to the differential pressure dP=P1–P2.

The second strain gauge 242 is exposed on one side to high pressure P1 and on the other side to the atmosphere. Thus, the differential voltage from the second strain gauge will be proportional to the static gauge pressure P1gauge= P1-ATM.

Those skilled in the art will appreciate that the nodes of the strain gauges are coupled via the circuit board 210 to the pins 212 and that alternate means could be utilized for the coupling as explained hereinbefore.

According to the presently preferred embodiment, the glass tubes 214, 215 are mounted in the package with epoxy and their positions are located with the aid of roll pins 223, 225. Attachment of the tubes can also be done by soldering. The piezoresistive silicon membranes 214, 215 are preferably bonded to the respective tubes 214, 215 by thermoelectric (anodic) bonding. The package 202 is preferably made of stainless steel although other materials can be used. Exemplary illustrative dimensions, not intended in any way to limit the scope of the invention, is a package having an overall length of approximately 23mm (excluding the pins), and an overall diameter of approximately 18mm.

There have been described and illustrated herein several embodiments of a pressure sensor for sensing differential pressure and static gauge pressure in a fluid flow line.

While particular embodiments of the invention have been described, it is not intended that the invention be limited thereto, as it is intended that the invention be as broad in scope as the art will allow and that the specification be read likewise.

Thus, while particular structure has been disclosed, it will be appreciated that the method of the invention can be accomplished by other structure which provides two piezoresistive membrane strain gauges, exposes a first side of each membrane strain gauge to fluid at upstream high pressure, exposes the second side of the first membrane strain gauge to fluid at downstream low pressure, and exposes the second side of the second membrane strain gauge to atmospheric pressure.

In this regard, the structure of the apparatus may be broadly defined as having two piezoresistive strain gauges and three fluid ports with one side of both strain gauges exposed to one fluid port and the other side of each strain gauge exposed to a respective fluid port.

Moreover, it will be understood that the strain gauges may be located on individual pieces of silicon or on the same piece of silicon and the silicon may be attached to two tubes or a single dual chambered tube, etc. The fluid ports in the sensor header may be dimensioned and angled as needed to accomplish their purpose. The overall dimensions and materials of the sensor header, including the dimensions and location of the waist portion, are also variable within reason while still accomplishing the method disclosed.

It will therefore be appreciated by those skilled in the art that yet other modifications could be made to the provided invention without deviating from its spirit and scope as so claimed.

What is claimed is:

1. Apparatus for sensing differential pressure and static gauge pressure in a fluid flow line having an upstream high pressure and a downstream low pressure, comprising:
   (a) a sensor header having a first fluid port adapted to be exposed to upstream high pressure, a second fluid port adapted to be exposed to downstream low pressure, and a third fluid port adapted to be exposed to the atmosphere;
   (b) a first piezoresistive strain gauge, said first strain gauge being mounted between said first fluid port and said second fluid port such that strain exerted on said first strain gauge is proportional to the difference between the upstream and downstream pressure; and
   (c) a second piezoresistive strain gauge, said second strain gauge being mounted between said first fluid port and said third fluid port such that strain exerted on said second strain gauge is proportional to the difference between the upstream pressure and the atmosphere.

2. An apparatus according to claim 1 wherein said sensor header is substantially cylindrical and said second and third fluid ports each extend from an interior part of said header to a surface location of said header.

3. An apparatus according to claim 2 wherein said sensor header has a reduced diameter waist portion, one of said second and third fluid ports terminating at said waist portion.

4. An apparatus according to claim 1 wherein said first and second piezoresistive strain gauges are located on a single silicon membrane.

5. An apparatus according to claim 1 wherein said first piezoresistive strain gauge is located on a first silicon membrane and said second piezoresistive strain gauge is located on a second silicon membrane.

6. An apparatus according to claim 1 wherein said second and third fluid ports are formed in part by a dual chambered glass tube.

7. An apparatus according to claim 1 wherein said second and third fluid ports are formed in part by two glass tubes.

8. An apparatus according to claim 1 further comprising a sensor header cover means for isolating said second and third fluid ports.

9. An apparatus according to claim 8 wherein said sensor header is substantially cylindrical and said cover means defines two annular spaces between said header and said cover.

10. An apparatus according to claim 9 wherein said cover means comprises two rings.

11. A method for sensing differential pressure and static gauge pressure in a fluid flow line having an upstream high pressure and a downstream low pressure, comprising the steps of:
   (a) providing first and second piezoresistive membrane strain gauges;
   (b) exposing a first side of each membrane strain gauge to fluid at upstream high pressure;
   (c) exposing the second side of the first membrane strain gauge to fluid at downstream low pressure; and
   (d) exposing the second side of the second membrane strain gauge to atmospheric pressure.

12. A method according to claim 11 wherein said step of providing includes providing a separate silicon membrane for each strain gauge.

13. A method according to claim 11 wherein said step of providing includes providing a single silicon membrane with both strain gauges contained thereon.

14. A method according to claim 11 wherein said steps of exposing include (i) providing a sensor header having three fluid ports; (ii) mounting the first strain gauge between the first and second fluid ports; and (iii) mounting the second strain gauge between the first and third fluid ports.

15. Apparatus for sensing differential pressure and static gauge pressure in a fluid flow line having an upstream high pressure and a downstream low pressure, comprising:
   (a) a substantially cylindrical sensor header having a first fluid port adapted to be exposed to upstream high pressure, a second fluid port adapted to be exposed to downstream low pressure, and a third fluid port adapted to be exposed to the atmosphere;
   (b) a first piezoresistive strain gauge, said first strain gauge being mounted between said first fluid port and said second fluid port such that strain exerted on said first strain gauge is proportional to the difference between the upstream and downstream pressure; and
   (c) a second piezoresistive strain gauge, said second strain gauge being mounted between said first fluid port and said third fluid port such that strain exerted on said second strain gauge is proportional to the difference between the upstream pressure and the atmosphere, wherein said substantially cylindrical sensor header has first and second ends with a reduced diameter waist therebetween, said first fluid port is located at said first end, said second fluid port terminates between said first end and said waist, and said third fluid port terminates at said waist.

16. An apparatus according to claim 15 wherein said first and second piezoresistive strain gauges are located on a single silicon membrane.

17. An apparatus according to claim 15 wherein said first piezoresistive strain gauge is located on a first silicon membrane and said second piezoresistive strain gauge is located on a second silicon membrane.

18. An apparatus according to claim 15 further comprising a sensor header cover means for isolating said second and third fluid ports.

19. An apparatus according to claim 18 wherein said cover means comprises two rings.

20. Apparatus for sensing differential pressure and static gauge pressure in a fluid flow line having an upstream high pressure and a downstream low pressure, comprising:
   (a) a sensor header including:
      (1) a first piezoresistive silicon membrane strain gauge having one side of the gauge exposed to fluid at upstream high pressure and the other side of the gauge exposed to to fluid at downstream low pressure;
      (2) a second piezoresistive silicon membrane strain gauge having one side of the gauge exposed to fluid at upstream high pressure and the other side of the gauge exposed to to the atmosphere;

(3) a first port which is fluidly coupled to the first membrane strain gauge on the side of the gauge exposed to fluid at downstream low pressure and which extends to the surface of the header at a first location;

(4) a second port which is fluidly coupled to the second membrane strain gauge on the side of the gauge exposed to the atmosphere and which extends to the surface of the header at a second location; and (b) a sensor cover defining a first isolated annular space around said first location of said sensor header and a second isolated annular space around said second location of said sensor header, wherein said first isolated annular space is fluidly coupled to downstream low pressure and the second annular space is fluidly coupled to the atmosphere.

* * * * *